3,456,439
AUTOMOBILE POLLUTION ERADICATOR
Edith A. Hale, 310 E. 44th St., New York, N.Y. 10017
Filed June 26, 1967, Ser. No. 648,812
Int. Cl. F01n 3/02; B01d 5/00
U.S. Cl. 60—31                                                  3 Claims

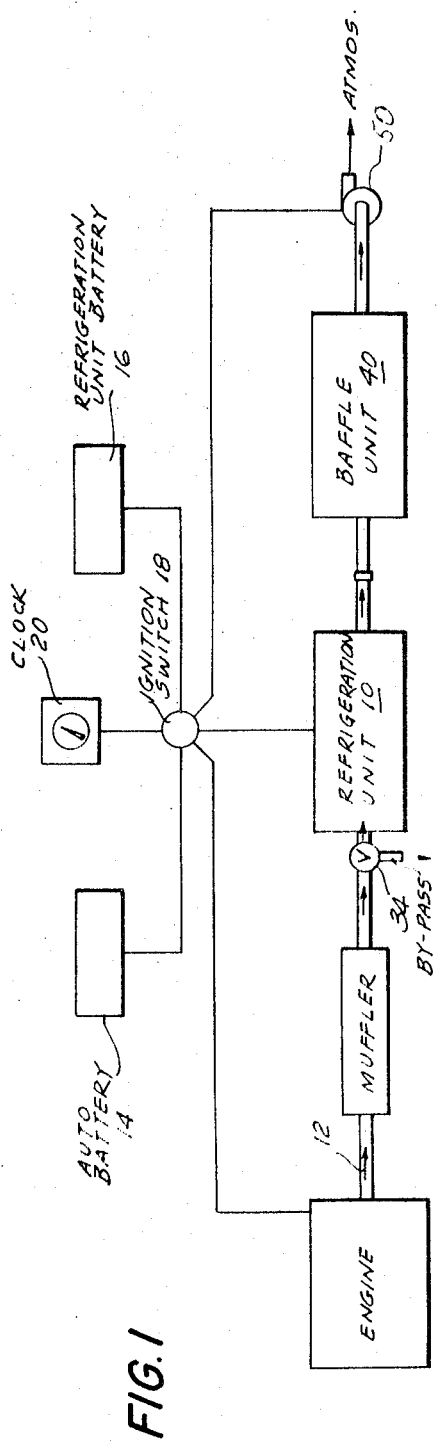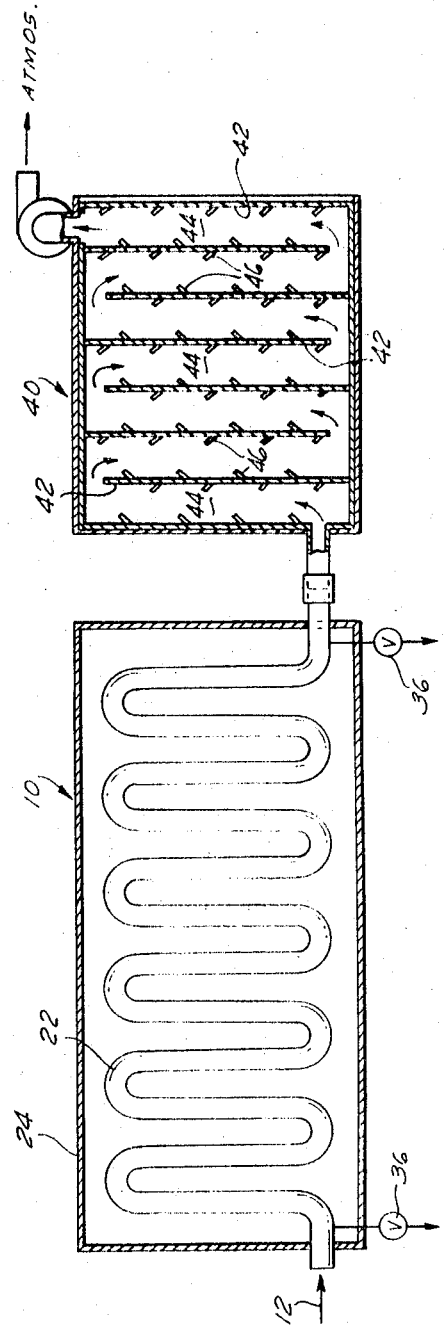

ABSTRACT OF THE DISCLOSURE

A pollution eradication system for automobiles having a refrigeration unit communicating with the automobile exhaust and a baffle unit for removing solid impurities connected to said unit. The system provides a clock device for automatic operation and a special power source for operating the system when the vehicle is not being operated.

---

This invention relates to air pollution eradication devices and more particularly such devices adapted to be associated with vehicular exhaust systems.

The invention contemplates the provision of apparatus to remove automobile smog, which is mainly composed of water vapor or fog and smoke which is the combustion residue of the gasoline and air mixture. The fog is eliminated principally in a refrigeration device connected into the automobile muffler and the unburnt particles in the smoke are removed in a specially designed baffle unit which receives the output of the refrigeration device. Noxious gases are for the most part lighter than air and are then permitted to escape into the atmosphere. Special provision is made for supplying power to and controlling the operation of the refrigeration device according to whether the vehicle is operating or not. The apparatus has an incidental advantage as a secondary muffler having special utility therefore in large trucks and buses.

One object of the invention is to provide an improved air pollution eradicator specially adapted for use in automobiles and the like.

Other objects and advantages of the invention may be appreciated on reading the following detailed description of one embodiment thereof being taken in conjunction with the accompanying drawings, in which:

FIG. 1 is a diagram illustrating the pollution eradication system including the electrical controls therefor; and FIG. 2 is an enlarged detail showing the housed refrigeration coils and the baffle unit components in the pollution eradication system.

Referring to the drawings, the refrigeration unit 10 is connected to automobile exhaust 12. The unit 10 is connected either to auto battery 14 or a specific refrigeration unit battery 16 depending on the setting of ignition switch 18 which is controlled by the ordinary car key to place the unit 10 in the auto battery line or by clock 20 to place the unit in the refrigeration unit battery 16. It is believed that the refrigeration unit should be kept at about 45° F. for its cooling coils to efficiently condense the fog in the engine produced smog. When the car is stopped and no gases are being produced, the clock serves to activate the refrigeration unit shortly before it is expected the automobile will be driven. In this manner the unit is brought to operating temperature at the time the engine is started.

The refrigeration unit 10 comprises cooling coils 22 within a container 24, housing the usual refrigeration components (not shown) including a circulator, condenser, expansion valve and evaporator disposed in proximity to the cooling coils 22. The coils have shut off valve 34 and a valve opening 36, for water escape.

The baffle unit 40 of the air pollution eradicator is made of a material light in weight, strong, non-combustible, waterproof and practically noiseless under vibration. The baffle unit is attached to the terminal end of the cooling coils 22, and receives and carries the exhaust stream forward and through this unit to the outside.

This baffle unit is composed of long, four sided oblong shaped bulkhead plates 42 which form air passage spaces 44. There are six to eight of these air passage spaces in the unit.

The passages are formed at each end to alternate the length of every other passage wall. This allows for smoke and pollution to pass through each passage of the unit for pollution eradication.

The four walls, the floor and ceiling of each passage space are covered with an entangling adhesive, capable of intercepting and holding pollution such as carbon, soot, tar, fuel incompletely burned, in the form of sludge, and other solids and semi-solids taken from the exhaust stream, and preventing it from passing out into our atmosphere. An intercepting and entangling adhesive that would be capable of preventing escape of this pollution, is known as "Tangle Foot," which has been on the market many years.

From the baffle unit the incompletely burned fuel, released from smog and other pollutants, will pass outside and rapidly rise above the atmosphere, and be dispersed ceasing thereby to be a menace to mankind.

The disposable adhesive lined baffles have small foils 46 on their surfaces to contact the exhaust stream. These foils create an extra turbulence and produce more contact with the adhesive areas.

Disposable baffles are to be manufactured and utilized in sections, and a whole section can be removed and replaced with a new section when necessary to facilitate pollution eradication.

In order to force the exhaust stream through the cooling coils and the extensive baffle areas, it will most likely require some more force than is supplied by the combustion engine.

This is supplied by a device resembling a small ventilating fan 50, applied at the terminal end of the exhaust pipe, and regulated to give proper amount of suction action for drawing the exhaust stream through cooling coils and baffle area, and blo wit to the outside.

This should not be a strong enough force to move the exhaust stream through at such a rapid rate that there is not time for the condensation and conversion of the fog to water, in the cooling coils, but only enough to draw it through the device and to the outside.

The ventilating or air reduction device is electrically operated from the battery system in the car, and when the ignition of the motor is switched on it should automatically start this exhaust fan, with this arrangement in action when the motor starts the smoke will be drawn off to eliminate the possibility of it fouling the motor.

What is claimed is:

1. An air pollution eradicator system comprising a refrigeration device, an internal combustion engine exhaust conduit connected thereto and a baffle unit communicating with said conduit and having adhesive means for removing pollutants, an ignition switch in control of said device, an auto battery and second battery connected to said switch and an electric clock in control of said switch.

2. A system as claimed in claim 1 wherein said baffle unit is provided with bulkhead plates which are adhesive lined and disposable.

3. A system as defined in claim 2 having gas suction means on the outlet side of said baffle unit.

References Cited

UNITED STATES PATENTS

| 1,917,857 | 7/1933 | Searles | 55—524 |
| 2,403,261 | 7/1946 | Clark | 55—524 |
| 2,768,705 | 10/1956 | Isserlis | 266—31 |
| 3,100,146 | 8/1963 | Huntington | 55—9 |

FOREIGN PATENTS

| 237,346 | 7/1925 | Great Britain. |

CARLTON R. CROYLE, Primary Examiner

D. HART, Assistant Examiner

U.S. Cl. X.R.

55—524